May 31, 1927.
O. FLENER
1,631,025
CURRENT THEFT INDICATOR
Filed Dec. 23, 1925
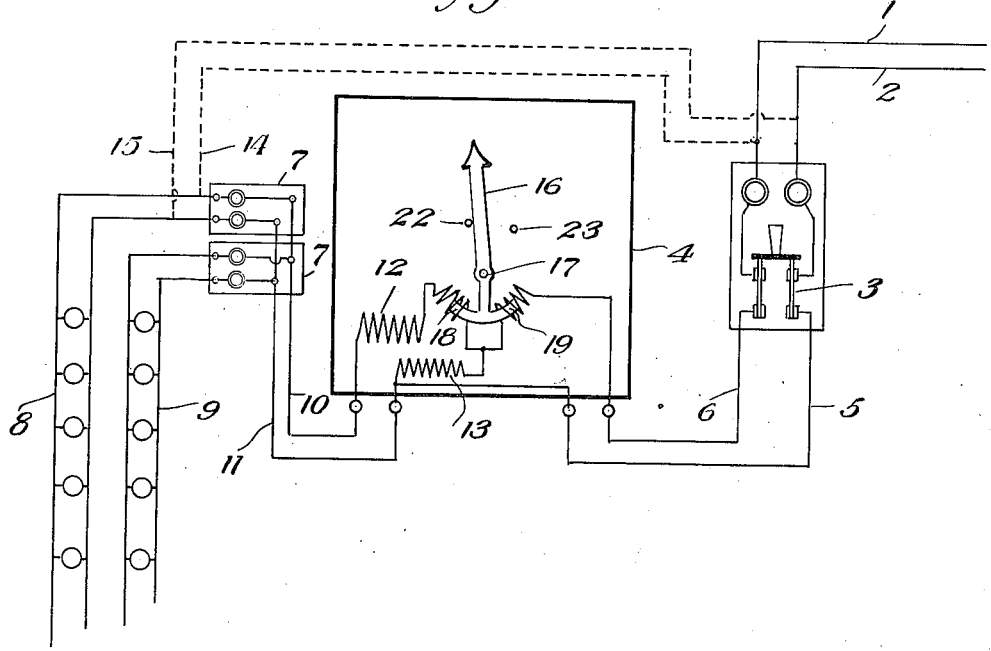
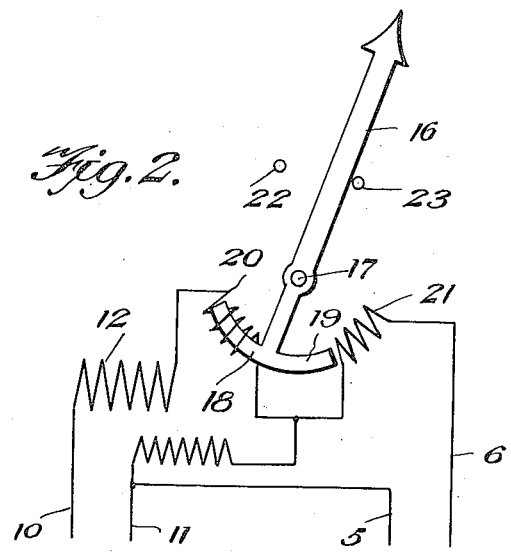
INVENTOR
Orill Flener
BY Victor J. Evans
ATTORNEY.

Patented May 31, 1927.

1,631,025

UNITED STATES PATENT OFFICE.

ORILL FLENER, OF FORT SMITH, ARKANSAS.

CURRENT-THEFT INDICATOR.

Application filed December 23, 1925. Serial No. 77,333.

This invention relates to signal devices for indicators and has for its general object the provision of an instrument adapted to be built into or combined with an electric current meter and operating to give a positive indication whenever an attempt is made to steal current by shunting around the meter as is frequently done by unscrupulous persons.

An important object of the invention is to provide an indicating device for this purpose which will positively act under all conditions and which, when once operated as the result of theft of current cannot be restored to normal position by the consumer but will be locked in such position as to give a visual indication to a meter reader or inspector that current has been tapped from the line circuit in advance of the line switch.

Still another object is to provide a device of this character in which the indicator itself or movable element thereof is so constructed, arranged and mounted as to avoid the necessity for employing any gage device for maintaining the signal in its theft indicating position after it has been once moved as the result of theft of current, the omission of gage means simplifying the construction.

An additional object is to provide a device of this character which will be simple and inexpensive in manufacture, which may be easily built into already existing meters, which will be efficient and positive in action, durable in service, and a general improvement in the art.

With the above and other objects and advantages in view, the invention consists in the details of construction and arrangement of parts to be hereinafter more fully described and claimed, and illustrated in the accompanying drawing in which:

Figure 1 is a diagrammatic view illustrating the invention as embodied in a standard circuit including a watt hour meter, control switch and other elements, and Figure 2 is a view of the indicator and parts immediately associated therewith showing the indicator as moved into signaling position.

Referring to the drawings in detail, the numerals 1 and 2 designate the current carrying wires of the incoming line, which wires connect with the usual entrance switch 3 located in advance of the meter indicated at 4 and connected with the line terminals thereof by conductors 5 and 6. The numeral 7 designates the fused branch blocks with which connect the branch circuits 8 and 9 to which current is to be supplied through the meter. While two branch blocks and branch circuits are shown, connected in parallel, it is obvious that the number is immaterial especially as this forms no part of the invention. The blocks have their terminals connected by conductors 10 and 11 with the load terminals of the meter.

The mechanical details of the meter 4 are not illustrated as being unnecessary to a proper understanding of the invention, though it should be stated that such a meter ordinarily includes a current coil 12 and a potential coil 13, the former being connected in series between one line terminal and one load terminal and the latter being connected with the other load terminal and with one end of the former and thereby constituting a connection across the line and the load.

It is well known that unscrupulous or dishonest persons tap off current in advance of the switch 3 or at any other point in advance of the meter by connecting conductors 14 and 15 with the incoming line wires 1 and 2 or the wires 5 and 6 and with one or more of the branch circuits as indicated by dotted lines in Figure 1. Under ordinary circumstances this will permit current to be used without it passing through the meter and such a practice may be resorted to without detection.

It is to prevent such theft and to protect electric light companies against such depredations that I have designed the present invention in the carrying out of which I provide an indicator 16 pivoted at 17 and terminating at its opposite end in oppositely extending arcuate arms 18 and 19 which constitute armatures. I also provide coils 20 and 21 encircling and acting upon the respective armature arms 18 and 19. These coils are connected in series with each other and with the current coil 12. The potential coil instead of being connected directly with the current coil, as in the ordinary practice as above described, is connected between the coils 20 and 21.

The indicator 16 is of such construction and is so mounted that under normal circumstances it stands slightly out of plumb as indicated in Figure 1 and rests against a stop pin 22. Located at some distance from the opposite side of the indicator is a second stop pin 23 for limiting its movement in its indicating position.

The exact construction of the coils 20 and 21 may of course be varied as may the detailed formation of the indicator though the intention is that these coils be so wound that when current passes through both, the magnetic effects of both will balance and no effect be produced upon the armature arms of the indicator. If, however, an attempt is made to steal current, as for instance by making the connections as shown by dotted lines in Figure 1, it is clear that current will flow, say, from the line wire 1, wire 14, one wire of the branch circuit 8, conductor 10, current coil 12, coil 20, potential coil 13, conductor 11, through the other wire of the branch circuit 8, and wire 15 back to the line wire 2. If the theft attempting connection be made in some other way current might flow through the coil 21 in completing the circuit. Regardless of this, it is clear that in either instance the energization of only one of the coils 20 or 21 will result in breaking the balance which exists under normal circumstances and the armature arms will be acted upon so as to swing the pointer or indicator 16 in the direction of the arrow in Figure 2, overbalancing it and causing it to swing into engagement with the stop pin 23. The mounting of the indicator 16 with respect to the center of gravity is such that even though the unauthorized connection be discontinued and the proper and legal connection restored subsequent energization of the coils 20 and 21, or either of them, will produce an insufficient magnetic effect to return the indicator to its normal position. In actual practice it is contemplated that the meter equipped with the device be provided with a window behind which or through which the indicator may be seen or will be moved when in theft indicating position. It is thus clear that it is beyond the power of the dishonest consumer to conceal that he has made an attempt, whether successful or not, to steal current. The device is consequently bound to be of great value in promoting honesty and protecting electric light companies from unauthorized use of current.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:

1. The combination with a watt hour meter having a current coil, and a potential coil therein bridging the line and load connection, the combination of a signal device including coils connected in series with each other and with said current coil, a movable indicator pivotally mounted and having armature arms acted upon by said coils whereby the indicator will remain normally in neutral position, said potential coil being connected between said coils to constitute a return connection.

2. The combination with a watt hour meter having a current coil, and a potential coil therein bridging the line and load connection, the combination of a signal device including coils connected in series with each other and with said current coil, a movable indicator pivotally mounted and having armature arms acted upon by said coils whereby the indicator will remain normally in neutral position, said potential coil being connected between said coils to constitute a return connection, said indicator being pivoted in overbalanced relation to one side, stop means engaged by the indicator for normally holding it in said overbalanced condition, and stop means for limiting movement of the indicator in the other direction.

3. The combination with a watt hour meter having an actuating coil therein, of a theft indicator comprising a pivoted member having oppositely arranged armature arms thereon, coils connected in series with said actuating coil and positioned to act upon said armature arms for normally maintaining the indicator in neutral position when current flows through the meter in the usual course, and a coil connected between said coils and connected with one load and one line terminal of the meter.

In testimony whereof I affix my signature.

ORILL FLENER.